(12) United States Patent
Ludwig et al.

(10) Patent No.: US 10,447,473 B2
(45) Date of Patent: Oct. 15, 2019

(54) METHOD AND DEVICE FOR GENERATING A CRYPTOGRAPHIC KEY

(71) Applicant: Robert Bosch GmbH, Stuttgart (DE)

(72) Inventors: Stephan Ludwig, Renningen-Malmsheim (DE); Thomas Strohm, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 15/722,722

(22) Filed: Oct. 2, 2017

(65) Prior Publication Data

US 2018/0115420 A1    Apr. 26, 2018

(30) Foreign Application Priority Data

Oct. 21, 2016    (DE) .................... 10 2016 220 734

(51) Int. Cl.
*H04L 29/06*    (2006.01)
*H04L 9/08*    (2006.01)

(52) U.S. Cl.
CPC ................... *H04L 9/0875* (2013.01)

(58) Field of Classification Search
CPC .................................................. H04L 9/0875
USPC ........................................................ 380/44
See application file for complete search history.

(56) References Cited

U.S. PATENT DOCUMENTS

| 8,094,823 | B1 * | 1/2012 | Sun | H04L 9/0841 380/282 |
| 8,566,247 | B1 * | 10/2013 | Nagel | H04L 63/045 380/270 |
| 2005/0060547 | A1 * | 3/2005 | Saito | H04L 12/40091 713/171 |
| 2008/0130900 | A1 * | 6/2008 | Hsieh | H04L 63/145 380/278 |
| 2011/0211700 | A1 * | 9/2011 | Park | H04L 63/061 380/282 |
| 2014/0208113 | A1 * | 7/2014 | Nakano | H04L 63/06 713/171 |

FOREIGN PATENT DOCUMENTS

| DE | 102014208974 A1 | 11/2015 |
| DE | 102014208975 A1 | 11/2015 |

* cited by examiner

*Primary Examiner* — Michael S McNally
(74) *Attorney, Agent, or Firm* — Norton Rose Fulbright US LLP; Gerard Messina

(57) ABSTRACT

A method for generating a cryptographic key, wherein a first node transmits a first signal on a first channel to a relay, a second node transmits a second signal on a second channel to the relay, the first node receives a third signal from the relay on the first channel and a fourth signal derived at least from the first signal and from the second signal, the second node receives the third signal and the fourth signal from the relay on the second channel, the first node determines the key based on the first signal, on the third signal and on the fourth signal and the second node determines the key based on the second signal, on the third signal and on the fourth signal.

9 Claims, 2 Drawing Sheets

METHOD AND DEVICE FOR GENERATING A CRYPTOGRAPHIC KEY

CROSS REFERENCE

The present application claims the benefit under 35 U.S.C. § 119 of German Patent Application No. DE 102016220734.2 filed on Oct. 21, 2016, which is expressly incorporated herein by reference in its entirety.

FIELD

The present invention relates to a method for generating a cryptographic key. The present invention also relates to a corresponding device, a corresponding computer program and a corresponding memory medium.

BACKGROUND INFORMATION

A symmetrical cryptosystem is a cryptosystem, in which, unlike an asymmetrical cryptosystem, all involved (legitimate) users use the same key. The use of one and the same key for encrypting and decrypting data, for calculating and checking message authentication codes, etc., means that prior to each encrypted exchange, the key itself must initially be distributed. However, since the security of the entire procedure depends on the secrecy of the key, conventional approaches mostly the key exchange over a secure channel. This may take place, in particular, by manually introducing the keys into the respective user, for example, by inputting a password, from which the actual key may then be derived.

In contrast, the key exchange over unsecure channels still presents a challenge to those skilled in the art, which is known in cryptography as "key distribution problem." To solve this problem, the related art offers approaches, such as the conventional Diffie-Hellman key exchange or so-called hybrid encryption methods, which enable the exchange of symmetrical keys by incorporating asymmetrical protocols.

In the recent past, however, cryptosystems have been increasingly discussed, which shift the problem of key establishment from the application layer of the OSI reference model to its bit transfer layer (physical layer, PHY). Such approaches are used in the nascent technical field of cyber-physical systems, which are distinguished by the use primarily of wireless and, therefore, inherently less secure communication channels.

German Patent Application No. DE 10 2014 208975 describes a method for generating a key in a network. In this method, the network includes at least one first user and one second user having a secured communication link to one another, as well as a third user, to which a secured communication link is to be established. The first user and the third user each generate a first partial value sequence based on properties of the transmission channel between the first user and the third user. The second user and the third user each generate a second partial value sequence based on properties of the transmission channel between the second user and the third user. In a secured part of the network, which includes at least the first and the second user, but not the third user, the key is then ascertained based at least on the first partial value sequence of the first user and on the second partial value sequence of the second user. The key is also generated in the third user based at least on the first partial value sequence and on the second partial value sequence.

In German Patent Application No. DE 10 2014 208974, a method is described for ascertaining a piece of information about the distance of a first device to at least one second device. The information about the distance in this case is ascertained as a function of a correlation between first values, which have been ascertained by the first device based on physical properties of a wireless transmission channel between the first device and a third device, and second values, which are ascertained by the second device based on physical properties of a wireless transmission channel between the second device and the third device.

SUMMARY

The present invention provides a method for generating a cryptographic key, a corresponding device, a corresponding computer program as well as a corresponding memory medium.

The method provided in this case is based on the following approach: two legitimate parties A and B transmit a training sequence to a relay. This relay emits the weighted sum of the received signals and subsequently transmits a training sequence itself, with which A and B are able to measure their channel to the relay. Non-participants receive only the sum of the channel measurement and are unable to deduce from this the individual summands. Based on the sum, however, A and B are each able to determine the other channel, because they measured their channel to the relay. The individual channels are used as starting material for generating a key.

In one first specific embodiment, after a synchronization phase, A and B transmit simultaneously the same training sequence for channel estimation. The relay receives the superposition of both signals and is therefore only able to estimate the sum of both channel impulse responses without, however, knowing the summands.

In a second specific embodiment, A and B transmit their training sequences in succession and the relay forms a weighted sum of the individual measuring results and emits this sum. Since the relay is able to differentiate the channels to A and B, it is able to superpose this sum weighted in such a way that A and B are each able to determine the reciprocal channel with the best possible signal-to-noise ratio.

One advantage of the method provided is its particular suitability for simple relays, which emit a received high-frequency signal again merely time delayed and amplified, without generating keys as a result. This approach allows, in particular, a key generation by two legitimate parties in static scenarios.

The method allows for the fact that neither A nor B are required to be moved for generating a key, i.e., for example, they may already be fixedly mounted. If the relay is moved, keys may therefore also be generated in the case of a completely static channel between A and B.

In the case of a non-static channel between A and B, the key generation rate may be increased by the method, so that a key of a fixed length is generated in a shorter period of time. Alternatively, the key quality may be enhanced as a result compared to conventional methods without relays. A method according to the present invention results in less complexity compared to conventional relay methods, because no key generation logic is required to be provided in the relay, but rather the high-frequency signal (HF signal) is processed directly. Thus, the relay may be manufactured smaller and more cost-efficiently and developed more cost-efficiently.

With the method, group keys, in addition to point-to-point keys, may also be established between A, B and the relay.

The method functions regardless of whether A and B are situated within the reciprocal radio range and are therefore able to communicate directly with one another or are able to communicate with one another only via the relay.

Furthermore, the relay in the first specific embodiment receives no information about the key, which it could reveal to an attacker (intended or unintended), in case this relay uses only one receiving antenna. In addition, the method in this specific embodiment is robust against attacks, in which a compromised relay re-emits its received signal modulated with a time-variant sequence.

A second specific embodiment has the additional advantage that the relay, by selecting the weights, may positively influence the measured signal-to-noise ratio of the sum signal in the case of A and B, and thus may also optimize the key generation rate or the residual error rate. This specific embodiment has the advantage over the first specific embodiment that it requires no exact synchronization of the transmission points in time and that at the same time it protects against attacks, in which the attacker knows the ratio of the reception power of both channels to the relay. Moreover, none of the aforementioned devices needs to be capable of duplex transmission (full duplex communication).

One variant of the two specific embodiments allows the sum signal to be transmitted from the relay to A and B with practically no further interference.

In another specific embodiment, the derived key remains unknown to the relay. As a result, the relay should be reliable only in that it does not use multiple antennas (simultaneously). This specific embodiment also offers protection against attacks of an active attacker, who uses a relay which re-emits a received signal modulated with a time-variant sequence.

Advantageous refinements of and improvements on the present invention are possible as a result of the measures described herein.

BRIEF DESCRIPTION OF THE DRAWINGS

Exemplary embodiments of the present invention are shown in the figures and described in greater detail below.

DETAILED DESCRIPTION OF EXAMPLE EMBODIMENTS

Figure 1:
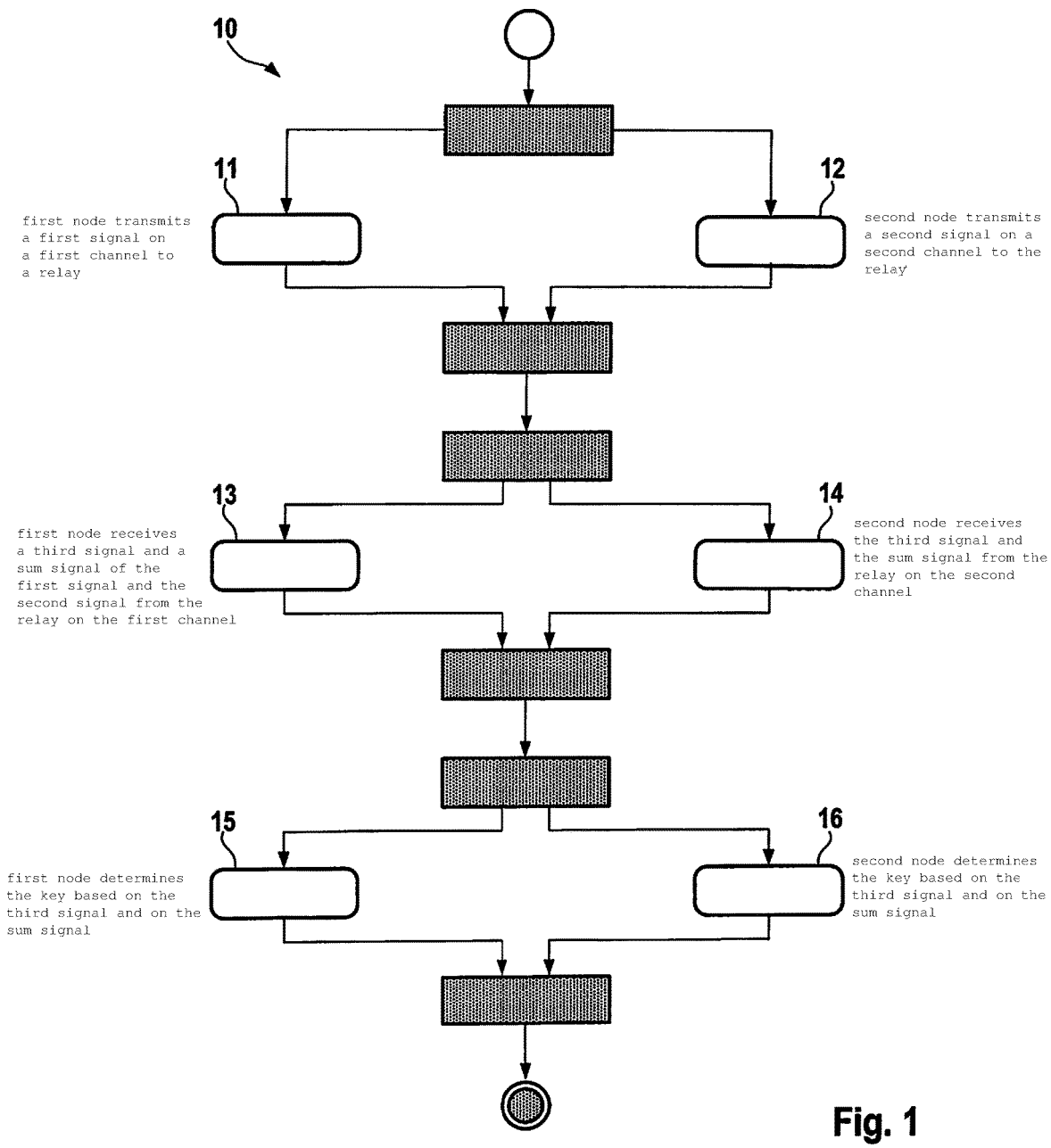
FIG. 1 shows the activity chart of a method according to the present invention.

FIG. 1 illustrates in a schematically simplified manner the base sequence of a method (10) according to the present invention: a first node transmits a first signal on a first channel to a relay (action 11); a second node transmits a second signal on a second channel to the relay (action 12); the first node receives (action 13) a third signal and a sum signal of the first signal and of the second signal from the relay on the first channel; the second node receives the third signal and the sum signal from the relay on the second channel (action 14); the first node determines the key based on the third signal and on the sum signal (action 15); and the second node determines the key based on the third signal and on the sum signal (action 16). The aim of this approach is for the first node and the second node to generate with the aid of the relay cryptographic keys, which remain unknown to third parties, while using a potentially static direct connection.

Figure 2:
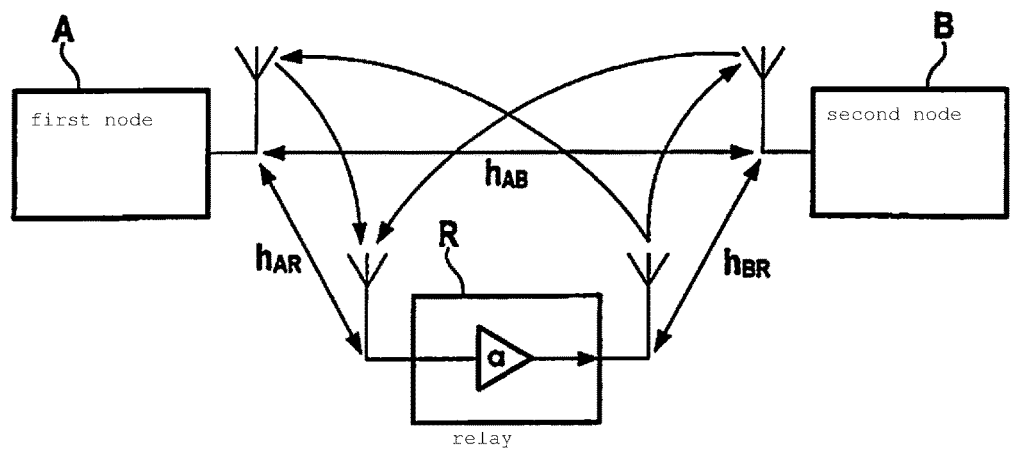
FIG. 2 shows a first specific embodiment of the present invention.

To illustrate a first specific embodiment, FIG. 2 shows a scenario in which relay (R) receives the first and second signals—hereinafter referred to as "training sequences" reflecting their function according to the present invention—transmitted identically by first node (A) and by second node (B), and subsequently emits them potentially amplified. The channels are referred to as follows: a first channel ($h_{AR}$) connects first node (A) to relay (R), a second channel ($h_{BR}$) connects second node (B) to relay (R) and a third channel ($h_{AB}$) interconnects first node (A) and second node (B), the channels being random. Based on generally known training sequences, the conversion between received signal and channel estimated value (via correlation with the training sequence) is trivial. For this reason, h is used substitutionally for channel or received signal.

One problematic situation arises in a conventional key generation if third channel ($h_{AB}$) does not change (i.e., is static), since then the channel virtually "contains" only the randomness of one single measuring result, on the basis of which a key could be generated. Any additional measurement in this case does not represent an event stochastically independent of the first measurement, so that the entropy of additional measuring results is unable to contribute to the cryptographic strength of the obtained key.

One method (10) suitable for overcoming this problem may—deviating from the depiction according to FIG. 1—be divided into four steps:

1. First node (A) and second node (B)—and also non-participating third parties due to overt radio transmission—learn from relay (R) the (optionally weighted) sum signal $\alpha h_{AR}+\beta h_{BR}$ of the channel measurements to relay (R). This channel measurement may be distorted in conjunction with the high-frequency transmission over first channel ($h_{AR}$) or over second channel ($h_{BR}$). At this point, it is expedient to distinguish between the various specific embodiments.

In the first specific embodiment according to FIG. 2, first node (A) and second node (B) select their transmission points in time on the same carrier frequency in such a way that their identical training sequences are received simultaneously and, therefore, superposed in relay (R). Different variants of the system are possible depending on the characteristic of the system and on the capabilities of the individual participants:

a. Relay (R) transmits the received sum signal in the same diversity channel, i.e., with negligible delay and thus essentially at the same point in time, at the same frequency, at the same spatial angle via the same antenna or antennas and with the same wave polarization. For this purpose, both relay (R) as well as first node (A) and second node (B) should be fully duplex-capable. If first node (A) and second node (B) are in range of each other, then channel ($h_{AB}$) should be static so that the method (10) functions. If they are situated out of range of each other, then the channel may also be time-variant.

b. Relay (R) transmits the received sum signal and the training sequence within the channel coherency time and channel coherency bandwidth of the first measurement, but on a different diversity channel, i.e., after receipt of the measuring signal, at another carrier frequency, at another spatial angle (in different main lobe directions in the case of multi-antenna systems or transmission and receiving antennas), with another wave polarization or a combination of the preceding options. Training sequence and received measuring signal may also be transmitted on separate diversity channels, as long as the two transmission operations take place within the channel coherency time and within the channel coherency bandwidth. This allows the measurement of the direct connection via third channel ($h_{AB}$) to be separated from the measurement of the sum channel. If first node (A) and second node (B) are fully duplex-capable and third channel ($h_{AB}$) is not static, then this measurement may also be used for key generation independently of further method (10), as a result of which the key generation rate increases.

In a second specific embodiment, first node (A) and second node (B) each transmit a training sequence to relay (R) in succession, but within the channel coherency time, whereby the training sequence of first node (A) may differ from that of second node (B), without departing from the scope of the present invention. Relay (R) stores the received measuring signals, adds these potentially weighted and emits the sum signal. Since first node (A), second node (B) and relay (R) do not transmit in the same diversity channels, no advantage results if these are fully duplex-capable, and third channel ($h_{AB}$) may be used in any case for key generation if third channel ($h_{AB}$) is not static.

In one variant, which is applicable for both specific embodiments, relay (R) digitizes the sum signal and transmits this signal digitally via a standard transmission method overtly to first node (A) and to second node (B). Instead of the sum signal, it is also possible to transmit digitally a sum signal processed via digital processing. Relay (R) may, in particular, calculate the sum channel directly, for example, by correlation with the training sequence.

In another variant, which is applicable for both specific embodiments, relay (R), with knowledge of the training sequence or sequences, determines the individual channels (specific embodiment 2) or their sum (specific embodiment 1) and transmits these, for example, digitally via a standard transmission method overtly to first node (A) and to second node (B).

2. Relay (R) transmits a training sequence, with which first node (A) and second node (B) measure their respective channel to relay (R).
3. First node (A) and second node (B) determine previously unknown second channel ($h_{BR}$) or first channel ($h_{AR}$), in each case based on the signals of the previous steps.
4. Both individual channels are used jointly or separately as starting material for generating a key in pairs.

Method (10) in the first specific embodiment begins with an initially conventional synchronization phase, in which first node (A) and second node (B) are precisely synchronized to approximately one signal sampling period (of the receivers)—this corresponds to an accuracy of approximately 25 ns at 40 MHz bandwidth in the case of a WLAN according to IEEE 802.11n—and during which a shared transmission point in time is established. If the differences in transit time between first channel ($h_{AR}$) and second channel ($h_{BR}$) differ significantly, then this effect is also taken into consideration for the transmission point in time. Both parties then transmit an identical training sequence, with which relay (R) is able to measure the channels to them: both signals arrive at relay (R) simultaneously and are superposed there at the antenna. If, as assumed below, each channel is equated for the benefit of a simplified representation with its own channel coefficient, then relay (R) therefore measures the sum $h_{AR}+h_{BR}$. Relay (R) then re-transmits the received signal potentially amplified and subsequently (the order may be arbitrary) also transmits within the channel coherency time of the first measurement a training sequence, which need not be identical to that of first node (A) and of second node (B). Since first node (A) and second node (B) measure first channel ($h_{AR}$), and second channel ($h_{BR}$) with the training sequence transmitted by relay (R), they are each able to calculate the other channel based on the sum signal, whereas an attacker is unable to deduce the summands from the sum signal.

The model of transmission is designed for the variants mentioned under No. b above, in which all participants need only be capable of an alternating operation (half duplex communication), as well as for the second specific embodiment described below, as follows: Based on undetermined carrier phases, first node (A) receives as a sum signal:

$$h_{A,1}=((\bar{h}_{AR}+h_{AR})e^{j\phi_A}+(\bar{h}_{BR}+h_{BR})e^{j\phi_B})(\bar{h}_{AR}+h_{AR})\gamma_A e^{j\phi_{R,1}}$$

and $$h_{A,2}=(\bar{h}_{AR}+h_{AR})\gamma_A e^{j\phi_{R,2}},$$

based on the training sequence transmitted by relay (R). Similarly, second node (B) receives $$h_{B,1}=((\bar{h}_{AR}+h_{AR})e^{j\phi_A}+(\bar{h}_{BR}+h_{BR})e^{j\phi_B})(\bar{h}_{BR}+h_{BR})\gamma_B e^{j\phi_{R,1}}$$

and $$h_{B,2}=(\bar{h}_{BR}+h_{BR})\gamma_B e^{j\phi_{R,2}},$$

based on the training sequence transmitted by relay (R).

All channel coefficients are assumed to be complex-valued with arbitrary distribution due to in-phase and quadrature transmission, the receiver noise in each case being ignored for the sake of simplicity in conjunction with the present explanations. In this case $\bar{h}_{AR}$ and $\bar{h}_{BR}$ refer to the mean value of each channel coefficient and $h_{AR}$ and $h_{BR}$ refer to the zero-mean fraction thereof.

In the following $$\sigma_{AR}^2 \triangleq \mathbb{E}\{h_{AR} \cdot h_{AR}^*\}$$

and $$\sigma_{BR}^2 \triangleq \mathbb{E}\{h_{BR} \cdot h_{BR}^*\}$$

are the variances of the channels, IE referring to the expected value operator. All measuring signals have certain phase indeterminacies $\phi^*$ due to the lack of phase reference. In addition, relay (R) and corresponding receiving hardware in any device may weight the signals with a factor $\gamma_A$ or $\gamma_B$. In the present exemplary embodiment, a reference carrier mis-tuned by a few kilohertz, which is used as a phase reference for all measurements, is transmitted simultaneously with the training sequence, so that phase indeterminacies $\phi^*=0$ for the measurements become ineffective via correction by the reference. Without loss of generality, the frequency flatness of the channels is assumed in this case. For frequency-selective channels, the above described multiplication would have to be replaced by a convolution and to be considered in the frequency range, potentially via Fourier transformation. In this case, a subcarrier may be used as a phase reference in the conventional manner, for example, in an orthogonal frequency multiplex method (orthogonal frequency-division multiplexing, OFDM), so that $\phi^*=0$ again applies with regard to this reference for the remaining subcarriers.

In order to obtain an estimated value for $\hat{h}_{BR}$ from the received signal, first node (A) estimates via several measurements the mean values $$\hat{\mu}_{A,2} = \mathbb{E}\{h_{A,2}\} \approx \overline{h}_{AR}\gamma_A,$$

$$\overline{\mu} = \mathbb{E}\left\{(h^*_{A,2} - \mu_{A,2})\frac{h_{A,1}}{h_{A,2}}\right\} \approx \gamma^*_A \sigma^2_{AR}$$

as well as the variances $$\hat{\sigma}^2_{A,2} = \mathbb{E}\{(h_{A,2}-B_{A,2})^2 \approx |\gamma_A|^2 |\sigma_{AR}|^2\}$$

and $$\hat{\sigma}^2_{AR} = \frac{|\overline{\mu}|^2}{\hat{\sigma}^2_{A,2}}.$$

Thus, each of the estimated values for the relay channel values may be determined separately of one another to yield $$\hat{h}_A = h_{A,2}\frac{\overline{\mu}}{\hat{\sigma}^2_{A,2}} \approx \overline{h}_{AR} + h_{AR}$$

and $$\hat{h}_B = \frac{h_{A,1}}{h_{A,2}} - \hat{h}_A \approx \overline{h}_{BR} + h_{BR}.$$

Second node (B) proceeds similarly.

Now, $\hat{h}_A$ and $\hat{h}_B$ may be used as input measured values for a shared key generation method or for key generation methods operating separately from one another.

This method (10) is particularly robust against erroneous behavior of relay (R). Thus, an active attacker could compromise relay (R) to such an extent that it adds a time-variant term to the received signal (chronologically constant terms do not contribute to key generation and are therefore not relevant) or multiplies it with a time-variant factor (time-variant factors are equally irrelevant). In this case, however, first node (A) and second node (B) would ascertain different measured values $\hat{h}_A$ and $\hat{h}_B$. These, in turn, would result in keys differing from one another, which would be discovered in later steps of the key generation. Thus, relay (R) cannot adversely impact the signal without being noticed and method (10) is robust against active attacks on relay (R).

Figure 3:
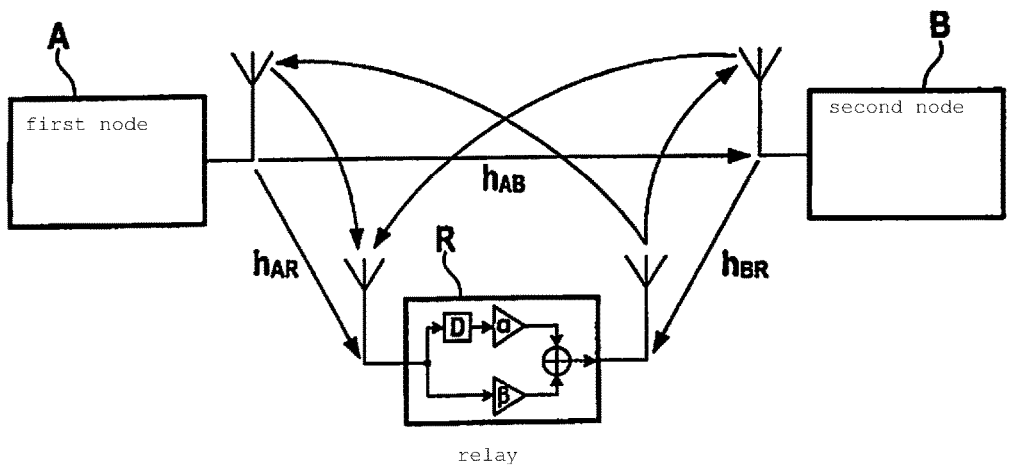
FIG. 3 shows a second specific embodiment of the present invention.

In the second specific embodiment according to FIG. 3, relay (R) receives in succession a not necessarily identical training sequence of first node (A) and of second node (B), respectively, and subsequently transmits the resulting sum signal. For this purpose, relay (R) must temporarily store the received signal, which advantageously takes place through digital signal processing.

In this specific embodiment, after a rough synchronization phase, in which first node (A) and node (B) coordinate their transmission points in time and negotiate method parameters, both parties transmit successively but within the channel coherency time, a training sequence, with which relay (R) is able to measure the channels to them: relay (R) measures $h_{AR,1}$ and $h_{BR,1}$, and transmits the superposition $\alpha h_{AR,1} + \beta h_{BR,1}$ of the high-frequency signals again within the channel coherency time and channel coherency bandwidth of the first measurements. In addition, it overtly discloses $\alpha$ and $\beta$ in the event $\alpha \neq \beta$ has been selected. Because first node (A) and second node (B) do not have to transmit simultaneously, no synchronization of the transmission points in time as exact as in the case of the first specific embodiment is necessary. Subsequently (the order may be arbitrary), relay (R) transmits a training sequence within the channel coherency time and channel coherency bandwidth of the first measurements. Since first node (A) and second node (B) with the training sequence transmitted by relay (R) measure the channel coefficients $h_{AR,2}=h_{AR,1}=h_{AR}$ and $h_{BR,2}=h_{BR,1}=h_{BR}$, due to the reciprocity, they are each able to calculate the other channel based on the received sum signal with the aid of the disclosed factors $\alpha$ and $\beta$, whereas an attacker is unable to deduce the summands from the sum signal.

The model of transmission is designed with the same assumptions as in the case of the first specific embodiment as follows: Due to undetermined carrier phases, first node (A) receives as the sum signal $$h_{A,1}=(\alpha(\overline{h}_{AR}+h_{AR})e^{j\phi_A}+\beta(\overline{h}_{BR}+h_{BR})e^{j\phi_B})(\overline{h}_{AR}+h_{AR})\gamma_A e^{j\phi_{B,1}}$$

and $$h_{A,2}=(\overline{h}_{AR}+h_{AR})\gamma_A e^{j\phi_{B,2}},$$

based on the sequence transmitted by relay (R).

Similarly, second node (B) receives $$h_{B,1}=(\alpha(\overline{h}_{AR}+h_{AR})e^{j\phi_A}+\beta(\overline{h}_{BR}+h_{BR})e^{j\phi_B})(\overline{h}_{BR}+h_{BR})\gamma_B e^{j\phi_{B,1}}$$

and $$h_{B,2}=(\overline{h}_{BR}+h_{BR})\gamma_B e^{j\phi_{B,2}},$$

based on the training sequence transmitted by relay (R).

First node (A) obtains $\hat{h}_B$ by calculation based on the relation $$\beta\hat{h}_B\frac{h_{A,1}}{h_{A,2}} - \alpha\hat{h}_A,$$

$\hat{h}_A$ being determined exactly as in the case of the first specific embodiment. Determined estimated values $\hat{h}_A$ and $\hat{h}_B$ are then used as input values for a shared key generation method or for two key generation methods operating separately from one another.

In one advantageous embodiment, relay (R) selects factors $\alpha$ and $\beta$ in such a way that both channels possess the same (long-term) variance. This neutralizes the advantage of a hypothetical attacker, who knows the ratio of the reception power of first channel ($h_{AR}$) to that of second channel ($h_{BR}$). As an explanatory example, the extreme case is noted, in which the training sequence of first node (A) would be received with a much greater reception power than the training sequence of second node (B), for example, because first node (A) is positioned much closer to relay (R) than second node (B). Without compensating factors, the sum $h_{AR}+h_{BR}$ would then be dominated by first summand $h_{AR}$, and the attacker could use this sum as a suitable estimated value for determining $h_{AR}$ in order to attack method (10).

Furthermore, if first node (A) and second node (B) are located in direct radio range, second node (B) can estimate third channel ($h_{AB}$), if first node (A) transmits its training sequence. First node (A) proceeds similarly if second node (B) transmits so that if first channel ($h_{AR}$) is not static and, therefore, not useable for a key generation, third channel ($h_{AB}$) can also be used for key generation. With this measure, it is possible to again increase the key generation rate.

Alternatively, a shared group key for these parties may be generated in all variants of this second specific embodiment based on first channel ($h_{AR}$), second channel ($h_{BR}$) or third channel ($h_{AB}$), which are known to first node (A), second node (B) and relay (R).

In a modification suitable for both specific embodiments, relay (R) digitizes at least one of the received signals, superposes it in the manner described above and transmits the training sequence. Subsequently, relay (R) uses a known standard data transmission method, in order to transmit the digitized sum signal as well as values α and β to first node (A) and to second node (B) with practically zero energy loss. The transmitted training sequence may form a part of this data transmission. Alternatively, the transmission may take place significantly outside the channel coherence time and channel coherency bandwidth. In this way, first node (A) and second node (B) obtain the values $h_{A,2}$ and $h_{B,2}$ via measurement, as well as the now undistorted sum signal via practically error-free data transmission and are able to proceed as described above. In this case, first node (A) and second node (B) receive identical digitized values as the sum:

$$h_1 = (\overline{h}_{AR} + h_{AR})e^{j\phi_A} + (\overline{h}_{BR} + h_{BR})e^{j\phi_B},$$

for which reason under the assumption made above, first node (A) and second node (B) obtain the reciprocal channel by simply subtracting their own measurement from the sum.

In another specific embodiment, the relay may also estimate the (sum) channel based on the received signal and proceed with this channel instead of the received signal as described above.

What is claimed is:

1. A method for generating a cryptographic key, comprising:
    transmitting, by a first node, a first signal on a first channel to a relay;
    transmitting, by a second node, a second signal on a second channel to the relay;
    receiving, by the first node, a third signal from the relay on the first channel and a fourth signal derived at least from the first signal and from the second signal;
    receiving, by the second node, the third signal and the fourth signal from the relay on the second channel;
    determining, by the first node, the key based on the third signal and on the fourth signal; and
    determining, by the second node, the key based on the third signal and on the fourth signal.

2. The method as recited in claim 1, wherein:
    the transmitting of the first signal and the transmitting of the second signal are coordinated chronologically in such a way that the first signal and the second signal are superposed electromagnetically at the relay to form the fourth signal; and
    the first signal and the second signal coincide.

3. The method as recited in claim 2, wherein:
    the first signal, the second signal and the fourth signal are transmitted simultaneously;
    the first signal, the second signal and the fourth signal are transmitted at a matching carrier frequency;
    the first signal, the second signal and the fourth signal are transmitted in an essentially matching spatial angle; and
    the first signal, the second signal and the fourth signal are transmitted having an matching wave polarization.

4. The method as recited in claim 2, wherein at least one of:
    the fourth signal is transmitted after the first signal and after the second signal;
    the fourth signal is transmitted at a different carrier frequency than the first signal and the second signal;
    the fourth signal is transmitted in a different spatial angle than the first signal and the second signal; or
    the fourth signal is transmitted having a different wave polarization than the first signal and the second signal.

5. The method as recited in claim 1, wherein:
    the first signal and the second signal are transmitted time-delayed relative to one another; and
    the relay calculates the fourth signal additively based on the first signal and on the second signal.

6. The method as recited in claim 5, wherein when calculating the fourth signal, the first signal and the second signal are weighted differently.

7. The method as recited in claim 1, wherein the fourth signal is digitally transmitted.

8. A non-transitory machine-readable memory medium on which is stored a computer program for generating a cryptographic key, the computer program, when executed by a processor, causing the processor to perform:
    transmitting, by a first node, a first signal on a first channel to a relay;
    transmitting, by a second node, a second signal on a second channel to the relay;
    receiving, by the first node, a third signal from the relay on the first channel and a fourth signal derived at least from the first signal and from the second signal;
    receiving, by the second node, the third signal and the fourth signal from the relay on the second channel;
    determining, by the first node, the key based on the third signal and on the fourth signal; and
    determining, by the second node, the key based on the third signal and on the fourth signal.

9. A device for generating a cryptographic key, the device configured to:
    transmit, by a first node, a first signal on a first channel to a relay;
    transmit, by a second node, a second signal on a second channel to the relay;
    receive, by the first node, a third signal from the relay on the first channel and a fourth signal derived at least from the first signal and from the second signal;
    receive, by the second node, the third signal and the fourth signal from the relay on the second channel;
    determine, by the first node, the key based on the third signal and on the fourth signal; and
    determine, by the second node, the key based on the third signal and on the fourth signal.

* * * * *